(12) United States Patent
Sogawa et al.

(10) Patent No.: US 7,137,132 B2
(45) Date of Patent: Nov. 14, 2006

(54) OPTICAL PICKUP

(75) Inventors: Teruaki Sogawa, Osaka (JP); Hideaki Funakoshi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 463 days.

(21) Appl. No.: 10/619,629

(22) Filed: Jul. 16, 2003

(65) Prior Publication Data

US 2004/0017762 A1 Jan. 29, 2004

(30) Foreign Application Priority Data

Jul. 24, 2002 (JP) .......................... 2002-004569 U (51) Int. Cl.
*G11B 7/135* (2006.01)
(52) U.S. Cl. .................. 720/652; 369/112.01
(58) Field of Classification Search .................... None
See application file for complete search history.

(56) References Cited

U.S. PATENT DOCUMENTS 6,178,155 B1 * 1/2001 Ueda et al. .................. 720/692

FOREIGN PATENT DOCUMENTS

JP 2-218028 8/1990

* cited by examiner

*Primary Examiner*—William Korzuch
*Assistant Examiner*—Joseph Haley
(74) *Attorney, Agent, or Firm*—Morgan, Lewis & Bockius LLP (57) ABSTRACT

An optical pickup has a laser mounting surface formed around an opening portion of a laser hole while a notch groove ranging from the laser mounting surface to an operating hole is formed in a laser hole side wall portion. A fitting piece removably fitted into the notch groove is provided integrally with a metal holder which is provided for supporting a photodiode and which is locked in the laser mounting surface. The operating hole is defined between a forward end of the fitting piece and an inner end of the notch groove. A laser diode is fitted into a lock hole of the holder coaxial with the laser hole while a radiator plate is attached to the outer surface of the holder. Thus, the laser diode is held between the holder and the radiator plate.

5 Claims, 13 Drawing Sheets

PRIOR ART

FIG. 17

PRIOR ART

PRIOR ART

PRIOR ART

FIG. 19B

PRIOR ART

FIG. 19C

PRIOR ART

OPTICAL PICKUP

BACKGROUND OF THE INVENTION

1. Field of the Invention

The present invention relates to an optical pickup for use in a disk player such as a DVD player.

2. Description of the Related Art

Figure 16:
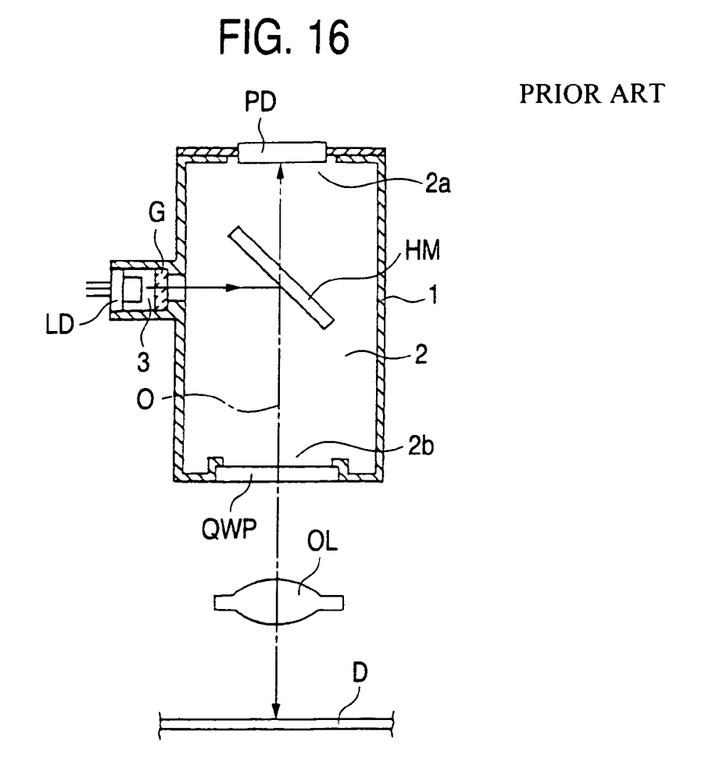
FIG. 16 is a principle view showing a related-art example.

FIG. 16 shows an example of an optical pickup in the related art. This optical pickup is configured as follows. That is, a beam passage hole 2 with a half mirror HM penetrates a base 1 made of synthetic resin. A photodiode PD is disposed in an opening portion 2a at one end of the beam passage hole 2 while a collimator lens QWP and an objective lens OL are disposed in an opening portion 2b at the other end of the beam passage hole 2. A laser diode LD and a diffraction grating G are disposed in a laser hole 3 communicating with the beam passage hole 2. A laser beam from the laser diode LD is projected onto a disk D through the diffraction grating G, the half mirror HM, the collimator lens QWP and the objective lens OL. The beam reflected from the disk D is received by the photodiode PD through the half mirror HM so that information recorded in the disk D can be read.

Figure 17:
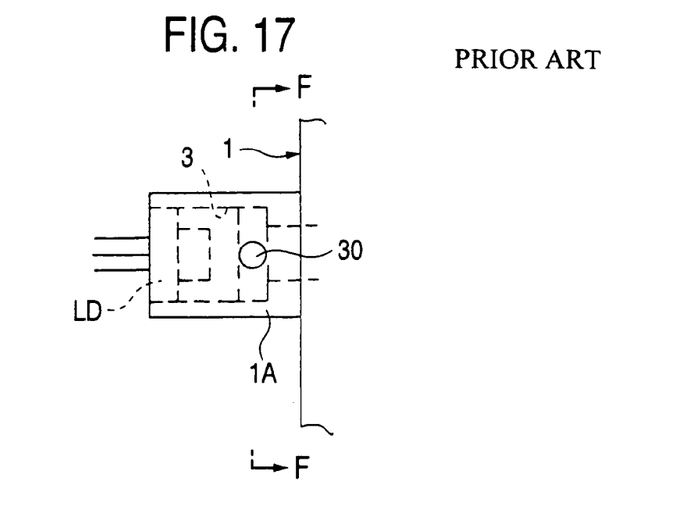
FIG. 17 is a side view showing the vicinity of a laser hole side wall portion in the related-art example.
Figure 18:
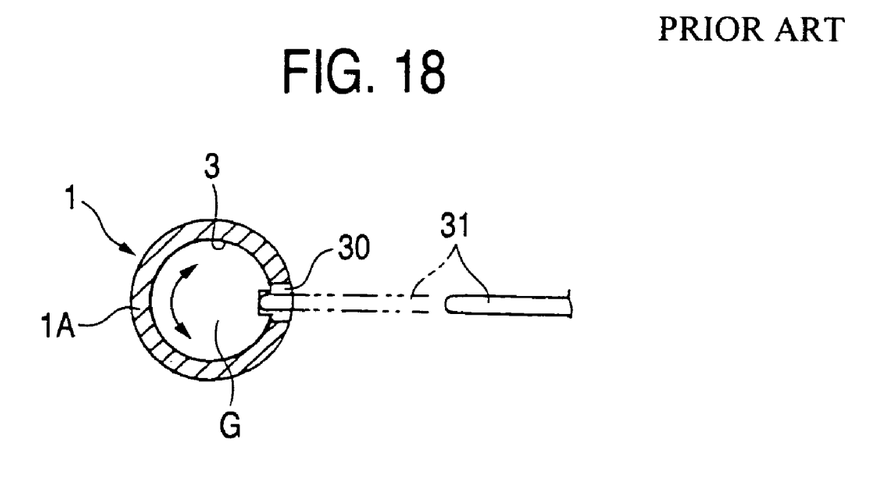
FIG. 18 is a sectional view taken along line F—F in FIG. 17.

In the related art, there is a structure for supporting the diffraction grating G, as disclosed in JP-A-2-218028. An example of such a structure will be described with reference to FIGS. 17 and 18. A diffraction grating operating hole 30 is provided in a laser hole side wall portion 1A of the base 1 so as to penetrate the laser hole side wall portion 1A. In an adjustment process prior to shipment, an operating rod 31 inserted into the operating hole 30 is brought into contact with the outer circumferential surface of the diffraction grating G so as to rotate the diffraction grating G at a predetermined angle. Thus, the laser beam is dispersed desirably. After that, the diffraction grating G is bonded to the laser hole side wall portion 1A by an adhesive agent.

Figure 19A:
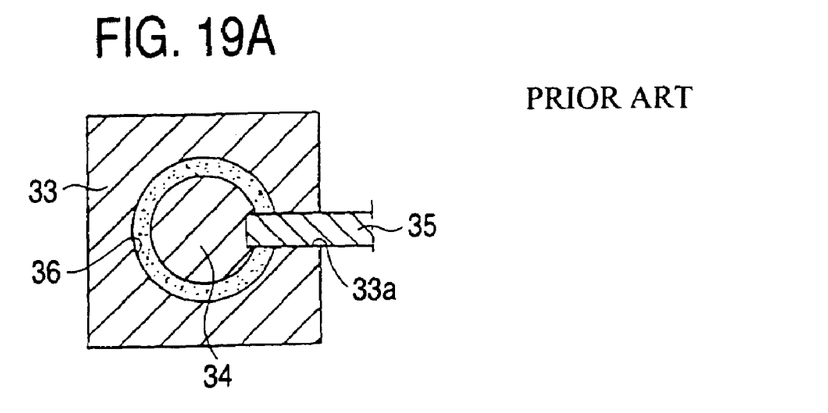
FIGS. 19A to 19C are schematic views showing the procedure for molding the laser hole side wall portion.
Figure 19B:
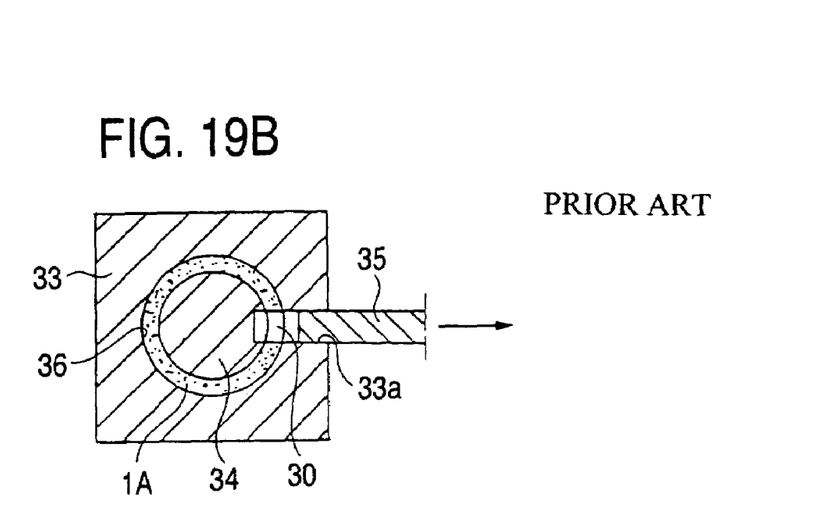
Figure 19C:
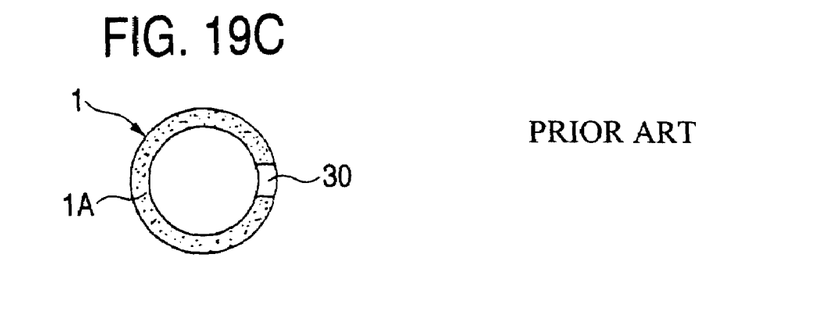

The procedure for molding the laser hole side wall portion 1A will be described with reference to schematic views shown in FIGS. 19A–19C. As shown in FIG. 19A, a core 34 is inserted into a mold 33. A slide pin 35 having the same diameter as that of a lock hole disposed in a slide hole 33a of the mold 33 is advanced to abut against the core 34. Synthetic resin is charged into an air gap 36 between the mold 33 and the core 34 so as to form the laser hole side wall portion 1A as shown in FIG. 19B. After that, the slide pin 35 is retracted, and the core 34 is extracted from the mold 33. Then, the base 1 having the laser hole side wall portion 1A with the operating hole 30 as shown in FIG. 19C is extracted from the mold 33.

In the configuration, the mold 33 with the slide pin 35 is required for molding the laser hole side wall portion 1A provided with the operating hole 30 penetrating the laser hole side wall portion 1A. Thus, the mold costs due to such a complicated structure. In addition, the molding cycle becomes complicated due to the operation of the slide pin 35. Thus, the cycle time becomes so long that the working efficiency deteriorates correspondingly. Further, even when necessity to repair the diffraction grating G due to an error in adjustment or the like occurs after the diffraction grating G has been bonded, the diffraction grating G cannot be extracted.

In addition, since the laser diode LD is pressed into the laser hole 3 of the base 1, not only the laser diode LD but also the diffraction grating G and the base 1 have to be abandoned when the laser diode LD is condemned as a defective product in examination prior to shipment. Thus, the cost for abandonment increases. In addition, the cost of material is indeed reduced due to the base 1 molded out of synthetic resin. But the radiating effect of the synthetic resin is so small that the base 1 may be deformed due to thermal expansion caused by the heating of the laser diode LD. Thus, there is a fear that an optical axis O connecting the photodiode PD and the objective lens OL may be bent to cause a reading error.

SUMMARY OF THE INVENTION

In consideration of the foregoing problems, an object of the present invention is to provide an optical pickup which is low in cost and high in radiating effect.

According to a first aspect of the invention, there is provided an optical pickup including: a half mirror; a base made of synthetic resin and having a beam passage hole which penetrates the base and in which the half mirror is disposed, a laser hole communicating with the beam passage hole, a diffraction grating operating hole provided to penetrate a laser hole side wall portion of the base, a laser mounting surface formed around an opening portion of the laser hole, and a notch groove formed in the laser hole side wall portion so as to range from the laser mounting surface to the operating hole; a photodiode disposed in an opening portion at one end of the beam passage hole; a collimator lens and an objective lens disposed in an opening portion at the other end of the beam passage hole; a laser diode disposed in the laser hole; a diffraction grating disposed in the laser hole; a photodiode supporting holder made of metal and attached to the laser mounting surface and having a plurality of radiator fins projecting thereon and a fitting piece integrally formed so as to project thereon and removably fitted into the notch groove, and a lock hole provided to penetrate the holder coaxially with the laser hole; and a radiator plate, wherein the operating hole is defined between a forward end of the fitting piece and an inner end of the notch groove, an operating rod inserted into the operating hole is brought into contact with an outer circumferential surface of the diffraction grating so as to rotate the diffraction grating at a predetermined angle, the laser diode is fitted into the lock hole of the holder while the radiator plate is attached to an outer surface of the holder, so that the laser diode is held between the radiator plate and the holder, screws are screwed down into threaded holes formed in the laser mounting surface, the screws penetrating the radiator plate and the holder so that the radiator plate and the holder are fixed to the base, a recess portion is formed in the laser mounting surface except circumferential edge portions of the threaded holes, so that an air gap is defined between the holder and the base through the recess portion, and a laser beam is projected from the laser diode onto a disk through the diffraction grating, the half mirror, the collimator lens and the objective lens, whereupon the beam reflected from the disk is received by the photodiode through the half mirror so that information recorded in the disk can be read.

With the configuration, the operating hole provided to penetrate the laser hole side wall portion is made to pass through the notch groove and open to the laser mounting surface. Thus, when the laser hole side wall portion is molded in a mold, a slide pin which has been required in the related art to provide the operating hole penetrating the laser hole side wall portion can be omitted. Accordingly, the structure of the mold becomes simple due to the omission of the slide pin, so that the cost of the mold can be reduced. In addition, the molding cycle becomes short due to the omission of the slide pin, so that the working efficiency can be improved correspondingly to the reduction of the molding cycle. Further, when necessity to repair the diffraction grating due to an error in adjustment or the like occurs after the diffraction grating has been bonded into the laser hole, the diffraction grating can be extracted through the notch groove. Accordingly, the diffraction grating can be reused economically.

In addition, since the laser diode is attached to the base through the holder, only the laser diode may be abandoned when the laser diode is condemned as a defective product in examination prior to shipment. Accordingly, the base separated from the defective laser diode can be reused. Thus, the cost for abandonment is reduced.

Further, in order to prompt laser diodes different in current consumption to radiate heat efficiently, a plurality of kinds of radiator plates different in dimensions are prepared. Accordingly, one kind of holder can be used in common. Thus, the cost can be reduced correspondingly to the sharing of the holder. Since the laser diode is held between the holder and the radiator plate, the laser diode can be locked surely in the lock hole of the holder. Accordingly, no locking units such as screws are required for locking the laser diode. Thus, the manufacturing cost can be reduced due to the omission of the locking units.

Furthermore, the radiator plate and the holder are fixed to the base integrally by screws. Accordingly, the work of fixing them can be performed quickly and easily with a reduced number of screws in comparison with the case where the radiator plate and the holder are fixed individually.

In addition, the area where the laser diode contacts with the holder and the radiator plate is wide, and a large number of radiator fins are provided to project over the holder. Accordingly, the laser diode is prompted to heat so that the laser diode can be actuated efficiently. In addition, the base is isolated from the heating of the laser diode by the holder while the holder and the base contact with each other only partially. Accordingly, there is no fear that the base made from synthetic resin is deformed due to thermal expansion caused by the heating of the laser diode. Thus, the optical axis connecting the photodiode and the objective lens can be kept in a desired straight line so that a reading error can be prevented from occurring. It is therefore possible to manufacture an optical pickup low in cost and high in accuracy.

According to a second aspect of the invention, there is provided an optical pickup including: a base made of synthetic resin and having a laser hole, a diffraction grating operating hole provided to penetrate a laser hole side wall portion of the base, a laser mounting surface formed around an opening portion of the laser hole, and a notch groove formed in the laser hole side wall portion so as to range from the laser mounting surface to the operating hole; a laser diode disposed in the laser hole; a diffraction grating disposed in the laser hole; and a photodiode supporting holder made of metal and attached to the laser mounting surface and having a fitting piece integrally formed so as to project thereon and removably fitted into the notch groove, wherein the operating hole is defined between a forward end of the fitting piece and an inner end of the notch groove, and an operating rod inserted into the operating hole is brought into contact with an outer circumferential surface of the diffraction grating so as to rotate the diffraction grating at a predetermined angle.

With the configuration, the operating hole provided to penetrate the laser hole side wall portion is made to pass through the notch groove and open to the laser mounting surface. Thus, when the laser hole side wall portion is molded in a mold, a slide pin which has been required in the related art to provide the operating hole penetrating the laser hole side wall portion can be omitted. Accordingly, the structure of the mold becomes simple due to the omission of the slide pin, so that the cost of the mold can be reduced. In addition, the molding cycle becomes short due to the omission of the slide pin, so that the working efficiency can be improved correspondingly to the reduction of the molding cycle. Further, when necessity to repair the diffraction grating due to an error in adjustment or the like occurs after the diffraction grating has been bonded into the laser hole, the diffraction grating can be extracted through the notch groove. Accordingly, the diffraction grating can be reused economically.

In an optical pickup according to a third aspect of the invention, the laser diode is fitted into a lock hole provided to penetrate the holder coaxially with the laser hole, while a radiator plate is attached to an outer surface of the holder, so that the laser diode is held between the radiator plate and the holder.

With the configuration, since the laser diode is attached to the base through the holder, only the laser diode may be abandoned when the laser diode is condemned as a defective product in examination prior to shipment. Accordingly, the base separated from the defective laser diode can be reused. Thus, the cost for abandonment is reduced. In addition, the base is isolated from the heating of the laser diode by the holder. Accordingly, it is possible to prevent the base from being deformed due to thermal expansion.

In addition, the laser diode is prompted to radiate heat by the holder and the radiator plate. Thus, the radiating effect is high. In order to prompt laser diodes different in current consumption to radiate heat efficiently, a plurality of kinds of radiator plates different in dimensions are prepared. That is, one kind of holder can be used in common. Thus, the cost can be reduced correspondingly to the sharing of the holder.

Further, since the laser diode is held between the holder and the radiator plate, the laser diode can be locked surely in the lock hole of the holder. Accordingly, no locking units such as screws are required for locking the laser diode. Thus, the manufacturing cost can be reduced due to the omission of the locking units. In addition, the area where the laser diode contacts with the holder and the radiator plate is so wide that the radiating effect is high.

In an optical pickup according to a fourth aspect of the invention, screws are screwed down into threaded holes formed in the laser mounting surface, the screws penetrating the radiator plate and the holder so that the radiator plate and the holder are fixed to the base.

With the configuration, the radiator plate and the holder are fixed to the base integrally by screws. Accordingly, the work of fixing them can be performed quickly and easily with a reduced number of screws in comparison with the case where the radiator plate and the holder are fixed individually.

In an optical pickup according to a fifth aspect of the invention, a recess portion is formed in one or both of an inner surface of the holder and the laser mounting surface except circumferential edge portions of the threaded holes, so that an air gap is defined between the holder and the base through the recess portion.

With the configuration, the holder and the base contact with each other only partially so that the base does not come under great thermal influence of the heating of the laser diode. Accordingly, the base can be prevented from being thermally deformed.

In an optical pickup according to a sixth aspect of the invention, a plurality of radiator fins are provided to project from the holder.

With the configuration, heat radiation is prompted further by a large number of radiator fins provided to project over the holder so that the laser diode can be actuated efficiently.

DETAILED DESCRIPTION OF THE PREFFERED EMBODIMENTS

Figure 6:
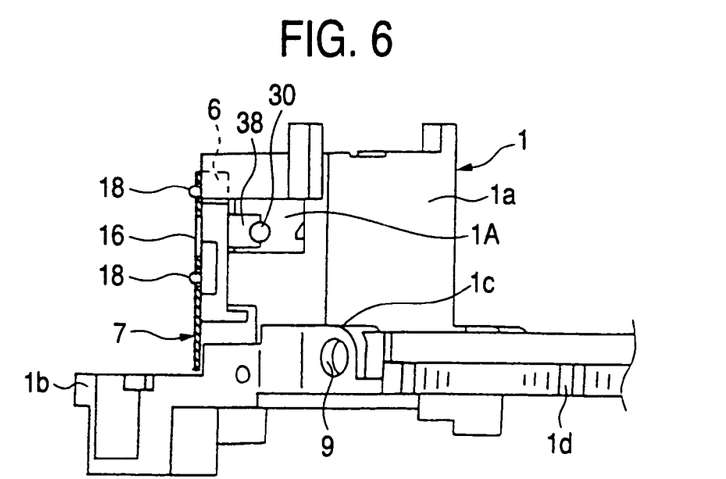
FIG. 6 is a side view of the optical pickup.

FIGS. 1 to 7 show an optical pickup according to an embodiment of the invention, which has a holder 6 made of metal, a radiator plate 7 made of metal, and a fitting piece 38 (see FIG. 6). The holder 6 is attached to a laser mounting surface 5 formed around an opening portion of a laser hole 3 of a base 1. The radiator plate 7 is attached to an outer surface of the holder 6. The fitting piece 38 is provided for forming an operating hole 30 of a laser hole side wall portion 1A. The other configuration is almost the same as that shown in FIG. 16. Thus, parts the same as those in FIG. 16 are denoted by the same reference numerals correspondingly, and description thereof will be therefore omitted.

Figure 2:
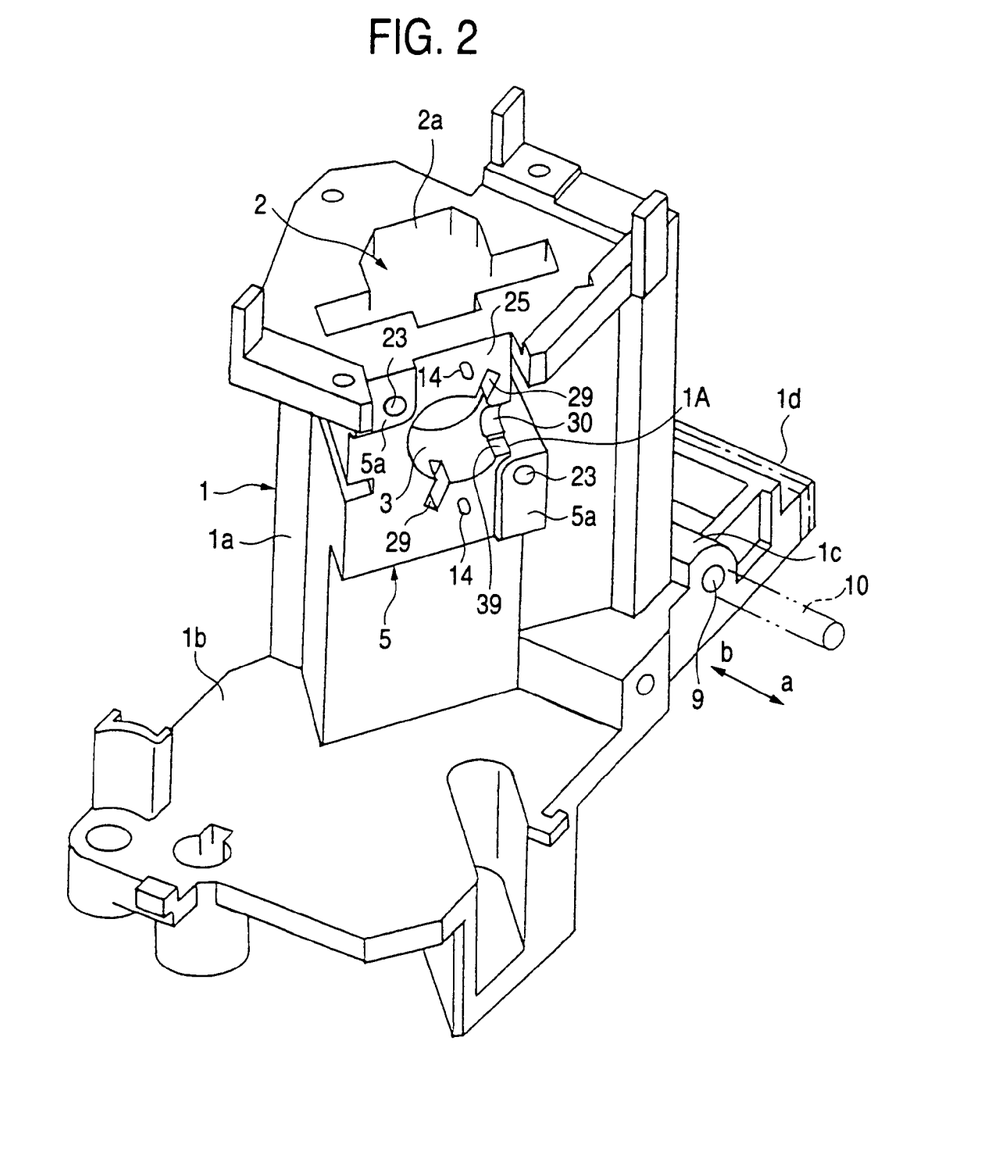
FIG. 2 is a perspective view of a base in the optical pickup.
Figure 7:
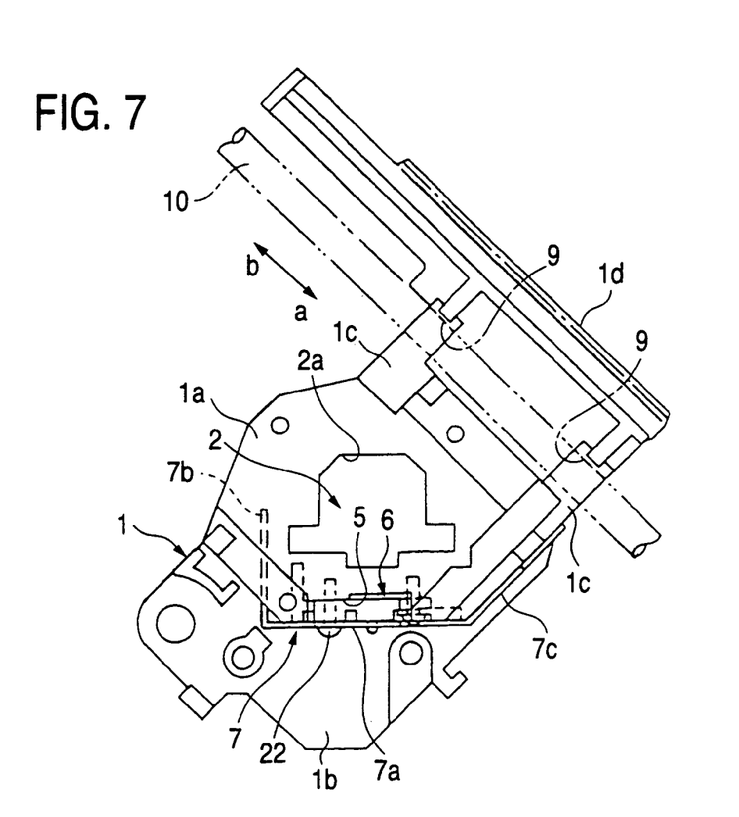
FIG. 7 is a plan view of the optical pickup.

The base 1 is molded out of hard synthetic resin. The base 1 has a cylindrical base body 1a, a substrate portion 1b, a pair of brackets 1c and a rack 1d as shown in FIGS. 2 and 7. The laser mounting surface 5 is formed in the base body 1a. The substrate portion 1b is formed integrally with the base body 1a. The brackets 1c and the rack 1d are provided integrally with the substrate portion 1b so as to project thereon. Through holes 9 of both the brackets 1c are movably fitted to a guide rod 10. When a pinion (not shown) meshing with the rack 1d is rotated forward or backward, the base 1 is moved in a forward direction "a" or in a backward direction "b" along the guide rod 10.

Figure 3:
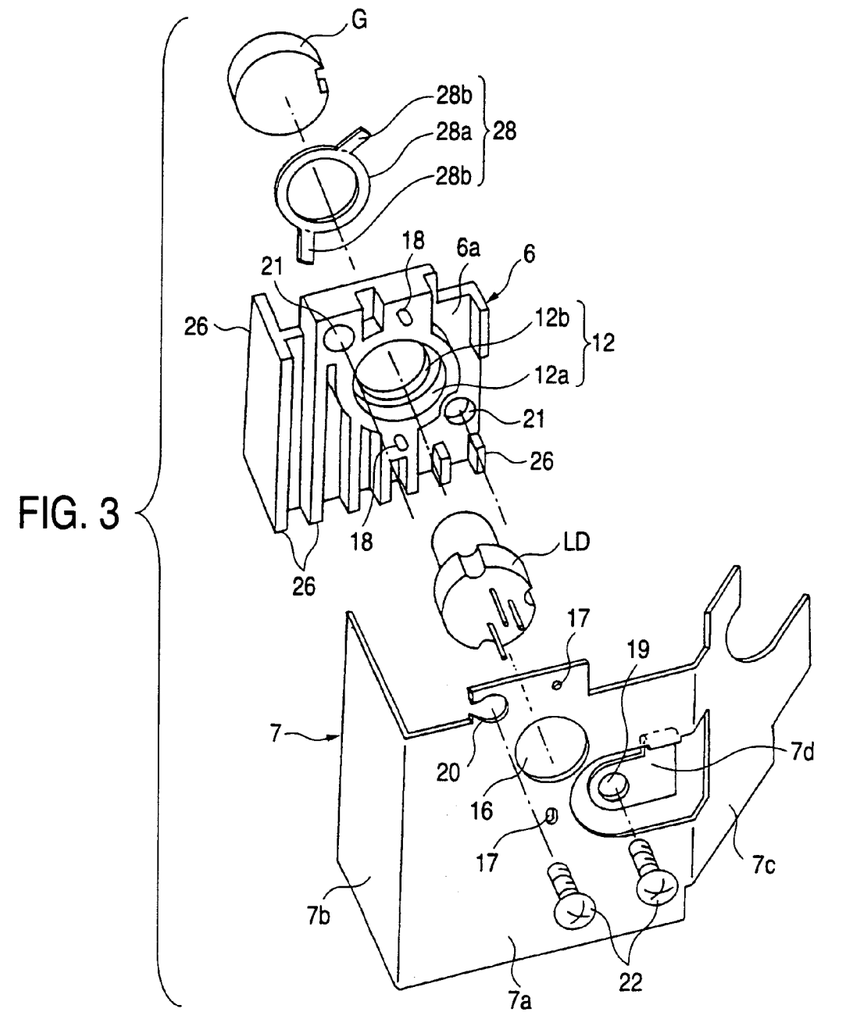
FIG. 3 is an exploded perspective view of a radiating structure in the optical pickup.
Figure 4:
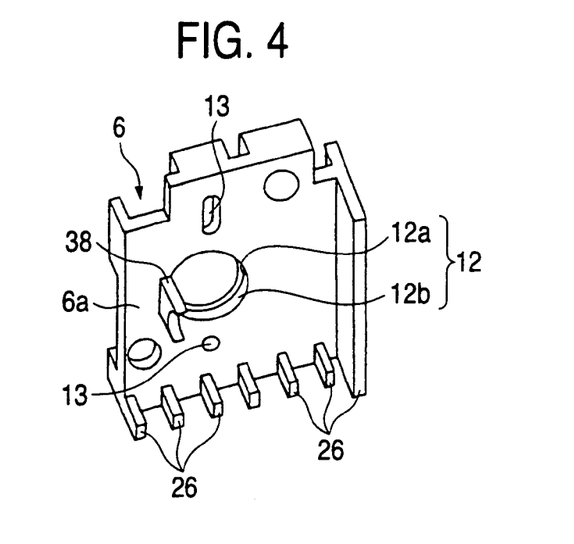
FIG. 4 is a perspective view of the inner circumferential surface side of a holder in the optical pickup.
Figure 5:
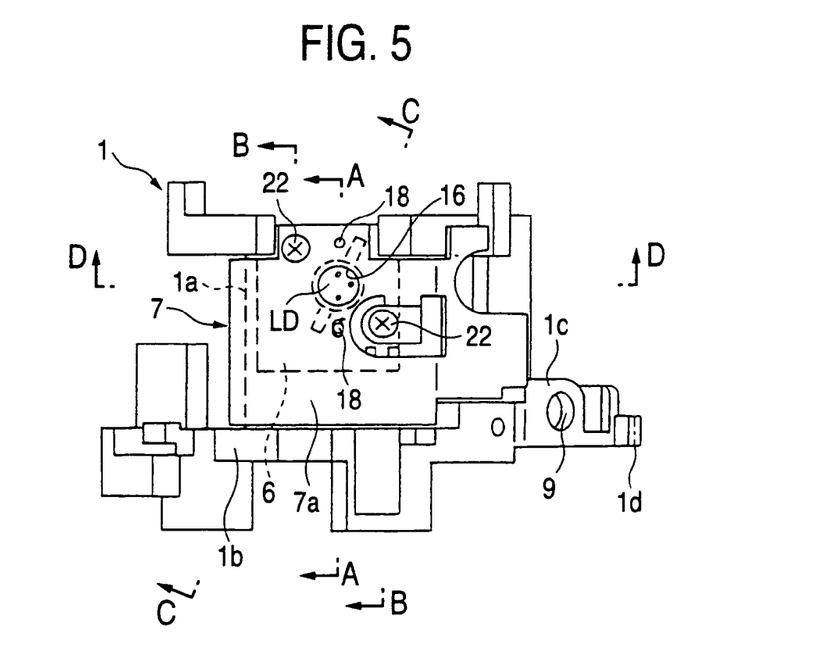
FIG. 5 is a front view of the optical pickup.
Figure 8:
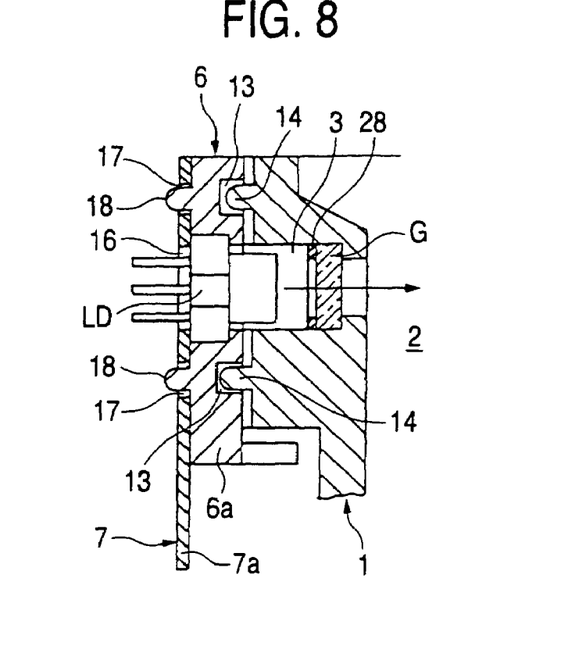
FIG. 8 is a sectional view taken along line A—A in FIG. 5.

As shown in FIGS. 3 and 4, the holder 6 has a rectangular holder body 6a having almost as large as the laser mounting surface 5. A lock hole 12 is provided to penetrate the substantially central portion of the holder body 6a. The lock hole 12 is constituted by a large-diameter portion 12a whose diameter is substantially equal to the outer diameter of the laser diode LD and a small-diameter portion 12b whose diameter is a little smaller than the diameter of the large-diameter portion 12a. The laser diode LD is fitted into the lock hole 12. Two positioning recess portions 13 are provided in an inner surface of the holder body 6a so as to put the lock hole 12 therebetween. The positioning recess portions 13 are fitted to two positioning protrusion portions 14 provided to project from the laser mounting surface 5, respectively. Thus, the laser diode LD is positioned coaxially with the laser hole 3 through the holder 6 (see FIG. 8).

With the configuration, the laser diode LD is attached to the base 1 through the holder 6. Accordingly, when the laser diode LD is condemned as a defective product in examination prior to shipment, only the laser diode LD can be abandoned. Thus, the diffraction grating G or the base 1 separated from the defective laser diode LD can be reused so that the cost for abandonment can be reduced. In addition, since the base 1 is isolated from the heating of the laser diode LD by the holder 6, the base 1 can be prevented from being deformed due to thermal expansion.

Figure 1:
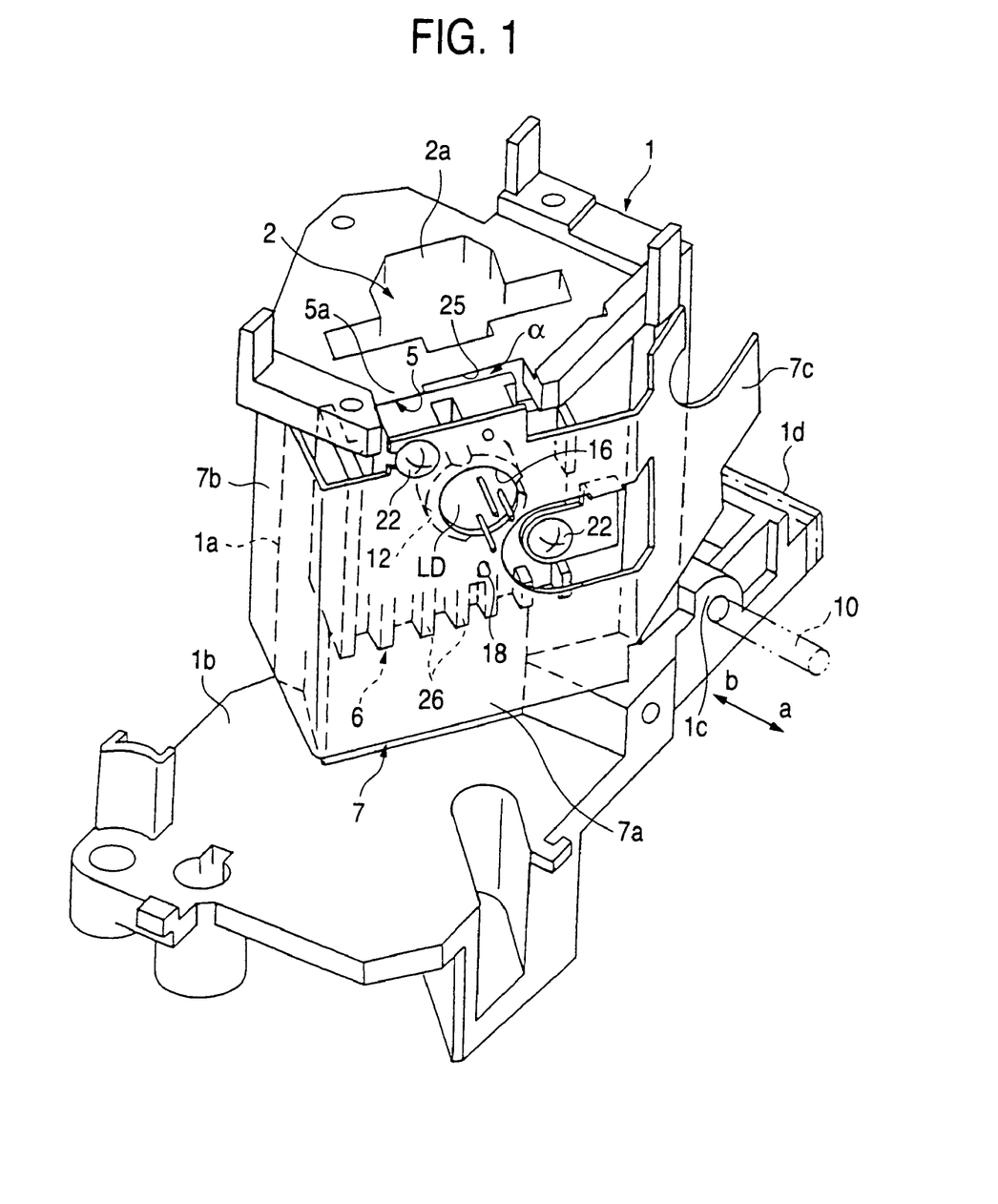
FIG. 1 is a perspective view of an optical pickup according to an embodiment of the present invention.

As shown in FIGS. 1 and 3, the radiator plate 7 is constituted by a radiator plate body 7a and a pair of left and right blades 7b and 7c. The radiator plate body 7a is opposed to the holder 6, and is one size larger than the holder 6. The blades 7b and 7c are bent from the opposite ends of the radiator plate body 7a toward the base 1. An engagement hole 16 whose diameter is a little smaller than that of the lock hole 12 is formed in the radiator plate body 7a. Two positioning holes 17 are formed in the radiator plate body 7a so as to put the engagement hole 16 therebetween. The positioning holes 17 are fitted to positioning projection portion 18 provided to project from the holder body 6a, respectively. Thus, the radiator plate 7 is positioned on the holder 6 while the engagement hole 16 is made coaxial with the engagement hole 12. As a result, the laser diode LD is held between the holder 6 and the radiator plate 7 (see FIG. 8).

Figure 9:
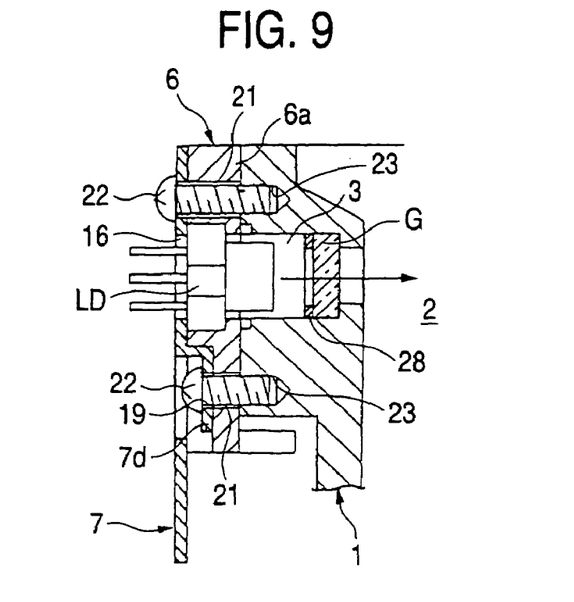
FIG. 9 is a sectional view taken along line B—B in FIG. 5.

In addition, a slit is formed in the radiator plate body 7a so as to leave a tongue piece 7d therein. Two screws 22 are inserted into through holes 21 of the holder body 6a through a through hole 19 of the tongue piece 7d and a circular notch portion 20 in a corner of the radiator plate body 7a, respectively. The screws 22 are screwed down into threaded holes 23 of the laser mounting surface 5. Thus, the radiator plate 7 and the holder 6 are fixed to the laser mounting surface 5 (see FIG. 9).

With the configuration, in order to prompt heat radiation of laser diodes LD different in current consumption, a plurality of kinds of radiator plates 7 different in dimensions are prepared. That is, one kind of holder 6 can be used in common. Thus, the cost can be reduced correspondingly to the sharing of the holder 6.

In addition, since the laser diode LD is held between the holder 6 and the radiator plate 7, the laser diode LD can be locked surely in the lock hole 12 of the holder 6. Accordingly, no locking units such as screws are required for locking the laser diode LD. Thus, the manufacturing cost can be reduced due to the omission of the locking units.

Further, the radiator plate 7 and the holder 6 are fixed to the base 1 by the screws 22. Accordingly, the work of fixing them can be performed quickly and easily with a reduced number of screws 22 in comparison with the case where the radiator plate 7 and the holder 6 are fixed individually.

As shown in FIGS. 1 and 2, a recess portion 25 is formed in the laser mounting surface 5 except circumferential edge portions 5a of the threaded holes 23 so that the circumferential edge portions 5a of the threaded holes 23 are formed to be one step higher than the recess portion 25. As a result, an air gap α is formed between the holder 6 and the base 1 through the recess portion 25 so that the holder 6 and the base 1 contact with each other only partially. Thus, the base 1 does not come under great thermal influence of the heating of the laser diode LD.

As shown in FIGS. 3 and 4, a large number of radiator fins 26 are provided to project all over the outer surface of the holder body 6a and the circumferential edge portion of the inner surface of the holder body 6a. Thus, heat radiation is prompted further by the large number of radiator fins 26 so that the laser diode LD can be actuated efficiently.

In short, the area where the laser diode LD contacts with the holder 6 and the radiator plate 7 is wide, and the large number of radiator fins 26 are provided to project over the holder 6. Accordingly, the laser diode LD is prompted to radiate heat so that the laser diode LD can be actuated efficiently. In addition, the base 1 is isolated from the heating of the laser diode LD by the holder 6 while the holder 6 and the base 1 contact with each other only partially. Accordingly, there is no fear that the base 1 made of synthetic resin is deformed due to thermal expansion caused by the heating of the laser diode LD. Thus, the optical axis O connecting the photodiode PD and the objective lens OL can be kept in a desired straight line so that a reading error can be prevented from occurring. It is therefore possible to manufacture an optical pickup low in cost and high in accuracy.

Figure 10:
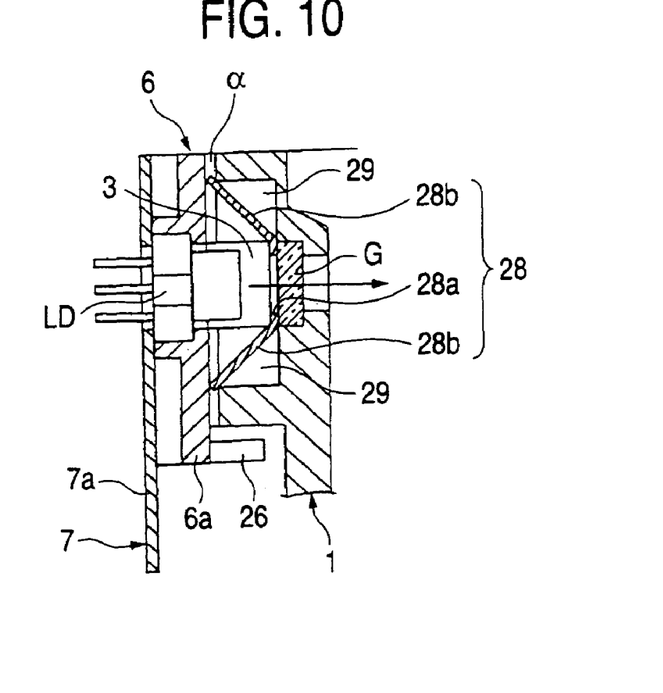
FIG. 10 is a sectional view taken along line C—C in FIG. 5.
Figure 11:
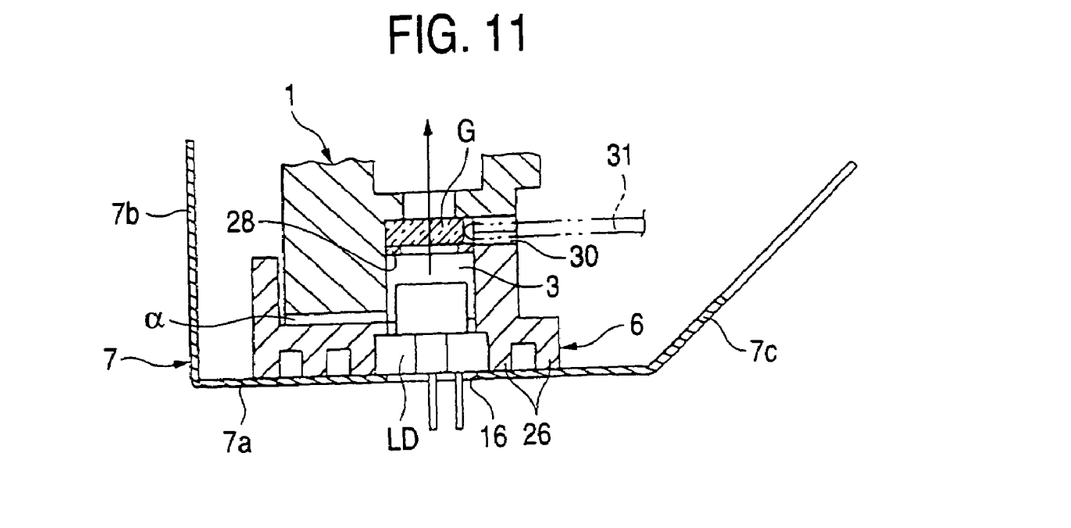
FIG. 11 is a sectional view taken along line D—D in FIG. 5.

In FIG. 3, the reference numeral 28 represents a rebound leaf made of a plate spring. The rebound leaf 28 is constituted by a ring portion 28a and a pair of foot portions 28b provided integrally with the ring portion 28a and extending outward. As shown in FIGS. 10 and 11, the ring portion 28a is inserted into the laser hole 3 while the foot portions 28b are inserted into a pair of groove portions 29 communicating with the laser hole 3, respectively. Thus, the rebound leaf 28 is elastically deformed and put between the holder 6 and the diffraction grating G so that the diffraction grating G can be prevented from rotating unexpectedly.

Figure 12:
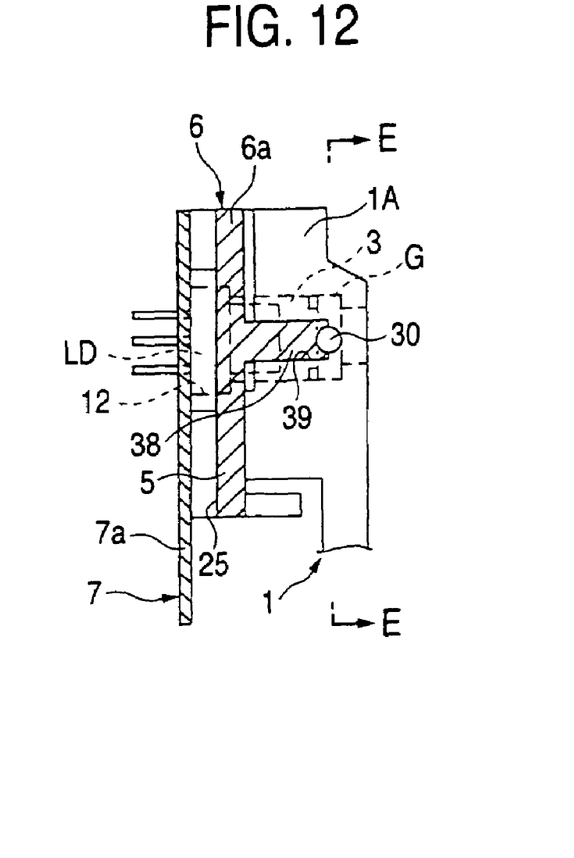
FIG. 12 is a partially cutaway side view showing the vicinity of a laser hole side wall portion in the optical pickup.
Figure 13:
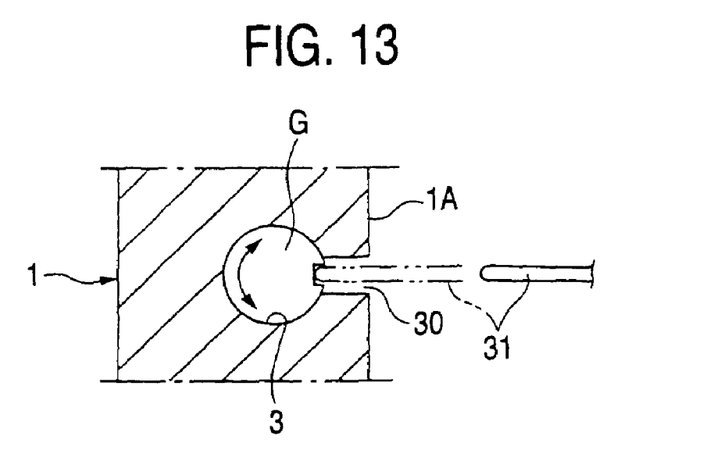
FIG. 13 is a sectional view taken along line E—E in FIG. 12.
Figure 14:
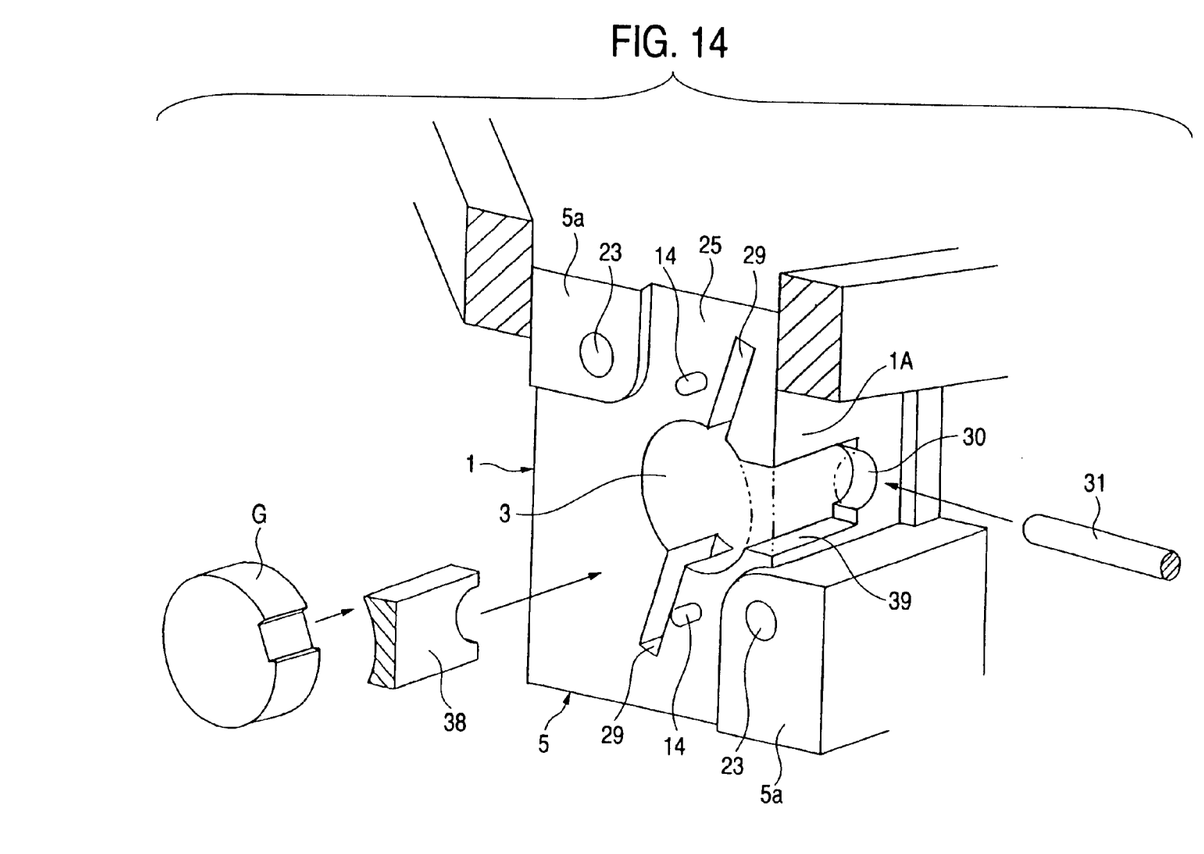
FIG. 14 is an exploded perspective view showing the vicinity of the laser hole side wall portion in the optical pickup.

As shown in FIGS. 12 to 14, the fitting piece 38 is provided in the inner surface of the holder body 6a so as to project thereon. The fitting piece 38 is removably fitted into a notch groove 39 ranging from the laser mounting surface 5 of the laser hole side wall 1A to the operating hole 30. Thus, the operating hole 30 is defined between the forward end of the fitting piece 38 and the inner end of the notch groove 39.

With the configuration, in an adjustment process prior to shipment, the operating rod 31 inserted into the operating hole 30 is brought into contact with the outer circumferential surface of the diffraction grating G so as to rotate the diffraction grating G at a predetermined angle (see FIG. 13). Thus, the laser beam is dispersed desirably. After that, the diffraction grating G is bonded to the laser hole side wall portion 1A by an adhesive agent.

Figure 15A:
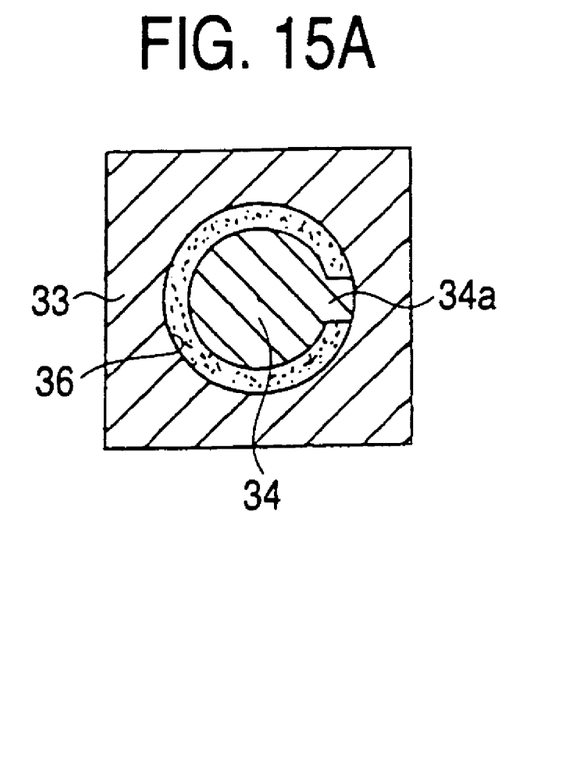
FIGS. 15A and 15B are schematic views showing the procedure for molding the laser hole side wall portion.
Figure 15B:
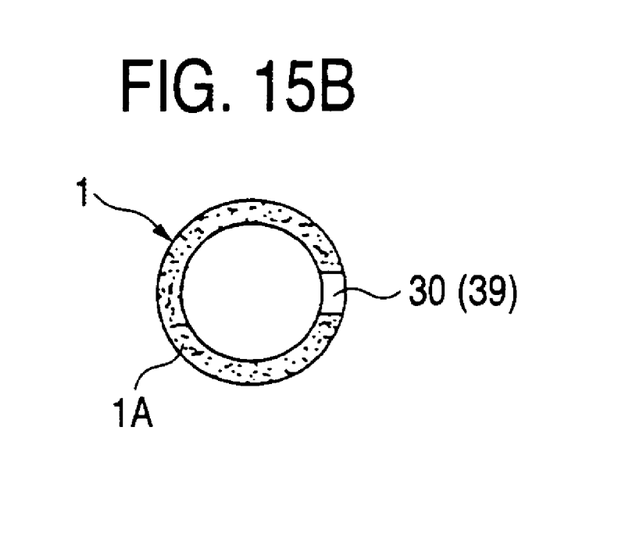

The procedure for molding the laser hole side wall portion 1A will be described with reference to the schematic views shown in FIGS. 15A and 15B. As shown in FIG. 15A, a projection portion 34a having a shape corresponding to the fitting piece 38 and the operating hole 30 is provided integrally with a core 34 so as to project thereon, and the core 34 is inserted into a mold 33. After that, synthetic resin is charged into an air gap 36 between the mold 33 and the core 34 so as to mold the laser hole side wall portion 1A. The core 34 is then extracted from the mold 33. Then, as shown in FIG. 15B, the base 1 having the laser hole side wall portion 1A with the operating hole 30 and the notch groove 39 is extracted from the mold 33.

With the configuration, the operating hole 30 provided to penetrate the laser hole side wall portion 1A is made to pass through the notch groove 39 and open to the laser mounting surface 5. Thus, when the laser hole side wall portion 1A is molded in the mold 33, a slide pin 35 (see FIG. 19A) which has been required in the related art to provide the operating hole 30 penetrating the laser hole side wall portion 1A can be omitted. Accordingly, the structure of the mold 33 becomes simple due to the omission of the slide pin 35, so that the cost of the mold can be reduced. In addition, the molding cycle becomes short due to the omission of the slide pin 35, so that the working efficiency can be improved correspondingly to the reduction of the molding cycle. Further, when necessity to repair the diffraction grating G due to an error in adjustment or the like occurs after the diffraction grating G has been bonded into the laser hole 3, the diffraction grating G can be extracted through the notch groove 39. Accordingly, the diffraction grating G can be reused economically.

Although the recess portion 25 is formed in the laser mounting source 5 in order to form the air gap a between the holder 6 and the base 1 in the configuration, the invention is not limited to this. The recess portion 25 may be formed in the inner surface of the holder 6, or the recess portion 25 may be formed in both the inner surface of the holder 6 and the laser mounting surface 5.

In the optical pickup according to the first aspect of the invention, the operating hole provided to penetrate the laser hole side wall portion is made to pass through the notch groove and open to the laser mounting surface. Thus, when the laser hole side wall portion is molded in a mold, a slide pin which has been required in the related art to provide the operating hole penetrating the laser hole side wall portion can be omitted. Accordingly, the structure of the mold becomes simple due to the omission of the slide pin, so that the cost of the mold can be reduced. In addition, the molding cycle becomes short due to the omission of the slide pin, so that the working efficiency can be improved correspondingly to the reduction of the molding cycle. Further, when necessity to repair the diffraction grating due to an error in adjustment or the like occurs after the diffraction grating has been bonded into the laser hole, the diffraction grating can be extracted through the notch groove. Accordingly, the diffraction grating can be reused economically.

In addition, since the laser diode is attached to the base through the holder, only the laser diode may be abandoned when the laser diode is condemned as a defective product in examination prior to shipment. Accordingly, the base separated from the defective laser diode can be reused. Thus, the cost for abandonment is reduced.

Further, in order to prompt laser diodes different in current consumption to radiate heat, a plurality of kinds of radiator plates different in dimensions are prepared. Accordingly, one kind of holder can be used in common. Thus, the cost can be reduced correspondingly to the sharing of the holder. Since the laser diode is held between the holder and the radiator plate, the laser diode can be locked surely in the lock hole of the holder. Accordingly, no locking units such as screws are required for locking the laser diode. Thus, the manufacturing cost can be reduced due to the omission of the locking units.

Furthermore, the radiator plate and the holder are fixed to the base integrally by screws. Accordingly, the work of fixing them can be performed quickly and easily with a reduced number of screws in comparison with the case where the radiator plate and the holder are fixed individually.

In addition, the area where the laser diode contacts with the holder and the radiator plate is wide, and a large number of radiator fins are provided to project over the holder. Accordingly, the laser diode is prompted to heat so that the laser diode can be actuated efficiently. In addition, the base is isolated from the heating of the laser diode by the holder while the holder and the base contact with each other only partially. Accordingly, there is no fear that the base made from synthetic resin is deformed due to thermal expansion caused by the heating of the laser diode. Thus, the optical axis connecting the photodiode and the objective lens can be kept in a desired straight line so that a reading error can be prevented from occurring. It is therefore possible to manufacture an optical pickup low in cost and high in accuracy.

In the optical pickup according to the second aspect of the invention, the operating hole provided to penetrate the laser hole side wall portion is made to pass through the notch groove and open to the laser mounting surface. Thus, when the laser hole side wall portion is molded in a mold, a slide pin which has been required in the related art to provide the operating hole penetrating the laser hole side wall portion can be omitted. Accordingly, the structure of the mold becomes simple due to the omission of the slide pin, so that the cost of the mold can be reduced. In addition, the molding cycle becomes short due to the omission of the slide pin, so that the working efficiency can be improved correspondingly to the reduction of the molding cycle. Further, when necessity to repair the diffraction grating due to an error in adjustment or the like occurs after the diffraction grating has been bonded into the laser hole, the diffraction grating can be extracted through the notch groove. Accordingly, the diffraction grating can be reused economically.

In the optical pickup according to the third aspect of the invention, the laser diode is attached to the base through the holder, so that only the laser diode may be abandoned when the laser diode is condemned as a defective product in examination prior to shipment. Accordingly, the base separated from the defective laser diode can be reused. Thus, the cost for abandonment is reduced. In addition, the base is isolated from the heating of the laser diode by the holder. Accordingly, it is possible to prevent the base from being deformed due to thermal expansion.

In addition, the laser diode is prompted to radiate heat by the holder and the radiator plate. Thus, the radiating effect is high. In order to prompt laser diodes different in current consumption to heat efficiently, a plurality of kinds of radiator plates different in dimensions are prepared. That is, one kind of holder can be used in common. Thus, the cost can be reduced correspondingly to the sharing of the holder.

Further, since the laser diode is held between the holder and the radiator plate, the laser diode can be locked surely in the lock hole of the holder. Accordingly, no locking units such as screws are required for locking the laser diode. Thus, the manufacturing cost can be reduced due to the omission of the locking units. In addition, the area where the laser diode contacts with the holder and the radiator plate is so wide that the radiating effect is high.

In the optical pickup according to the fourth aspect, the radiator plate and the holder are fixed to the base by screws. Accordingly, the work of fixing them can be performed quickly and easily with a reduced number of screws in comparison with the case where the radiator plate and the holder are fixed individually.

In the optical pickup according to the fifth aspect on the invention, the holder and the base contact with each other only partially so that the base does not come under great thermal influence of the heating of the laser diode. Accordingly, the base can be prevented from being thermally deformed.

In the optical pickup according to the sixth aspect of the invention, heat radiation is prompted further by a large number of radiator fins provided to project over the holder so that the laser diode can be actuated efficiently.

What is claimed is:

1. An optical pickup comprising:
   a half mirror;
   a base made of synthetic resin and having a beam passage hole which penetrates the base and in which the half mirror is disposed, a laser hole communicating with the beam passage hole, a diffraction grating operating hole provided to penetrate a laser hole side wall portion of the base, a laser mounting surface formed around an opening portion of the laser hole, and a notch groove formed in the laser hole side wall portion so as to range from the laser mounting surface to the operating hole;
   a photodiode disposed in an opening portion at one end of the beam passage hole;
   a collimator lens and an objective lens disposed in an opening portion at the other end of the beam passage hole;
   a laser diode disposed in the laser hole;
   a diffraction grating disposed in the laser hole;
   a photodiode supporting holder made of metal and attached to the laser mounting surface and having a plurality of radiator fins projecting thereon and a fitting piece integrally formed so as to project thereon and removably fitted into the notch groove, and a lock hole provided to penetrate the holder coaxially with the laser hole; and
   a radiator plate,
   wherein the operating hole is defined between a forward end of the fitting piece and an inner end of the notch groove,
   an operating rod inserted into the operating hole is brought into contact with an outer circumferential surface of the diffraction grating so as to rotate the diffraction grating at a predetermined angle,
   the laser diode is fitted into the lock hole of the holder while the radiator plate is attached to an outer surface of the holder, so that the laser diode is held between the radiator plate and the holder,
   screws are screwed down into threaded holes formed in the laser mounting surface, the screws penetrating the radiator plate and the holder so that the radiator plate and the holder are fixed to the base,
   a recess portion is formed in the laser mounting surface except circumferential edge portions of the threaded holes, so that an air gap is defined between the holder and the base through the recess portion, and
   a laser beam is projected from the laser diode onto a disk through the diffraction grating, the half mirror, the collimator lens and the objective lens, whereupon the beam reflected from the disk is received by the photodiode through the half mirror so that information recorded in the disk can be read.

2. An optical pickup comprising:

a base made of synthetic resin and having a laser hole, a diffraction grating operating hole provided to penetrate a laser hole side wall portion of the base, a laser mounting surface formed around an opening portion of the laser hole, and a notch groove formed in the laser hole side wall portion so as to range from the laser mounting surface to the operating hole;

a laser diode disposed in the laser hole, the laser diode is fitted into a lock hole provided to penetrate the holder coaxially with the laser hole, while a radiator plate is attached to an outer surface of the holder, so that the laser diode is held between the radiator plate and the holder;

a diffraction grating disposed in the laser hole; and a photodiode supporting holder made of metal and attached to the laser mounting surface and having a fitting piece integrally formed so as to project thereon and removably fitted into the notch groove, wherein the operating hole is defined between a forward end of the fitting piece and an inner end of the notch groove, and an operating rod inserted into the operating hole is brought into contact with an outer circumferential surface of the diffraction grating so as to rotate the diffraction grating at a predetermined angle.

3. The optical pickup according to claim 2, wherein screws are screwed down into threaded holes formed in the laser mounting surface, the screws penetrating the radiator plate and the holder so that the radiator plate and the holder are fixed to the base.

4. The optical pickup according to claim 3, wherein a recess portion is formed in one or both of an inner surface of the holder and the laser mounting surface except circumferential edge portions of the threaded holes, so that an air gap is defined between the holder and the base through the recess portion.

5. The optical pickup according to claim 2, wherein a plurality of radiator fins are provided to project from the holder.

* * * * *